No. 745,441.

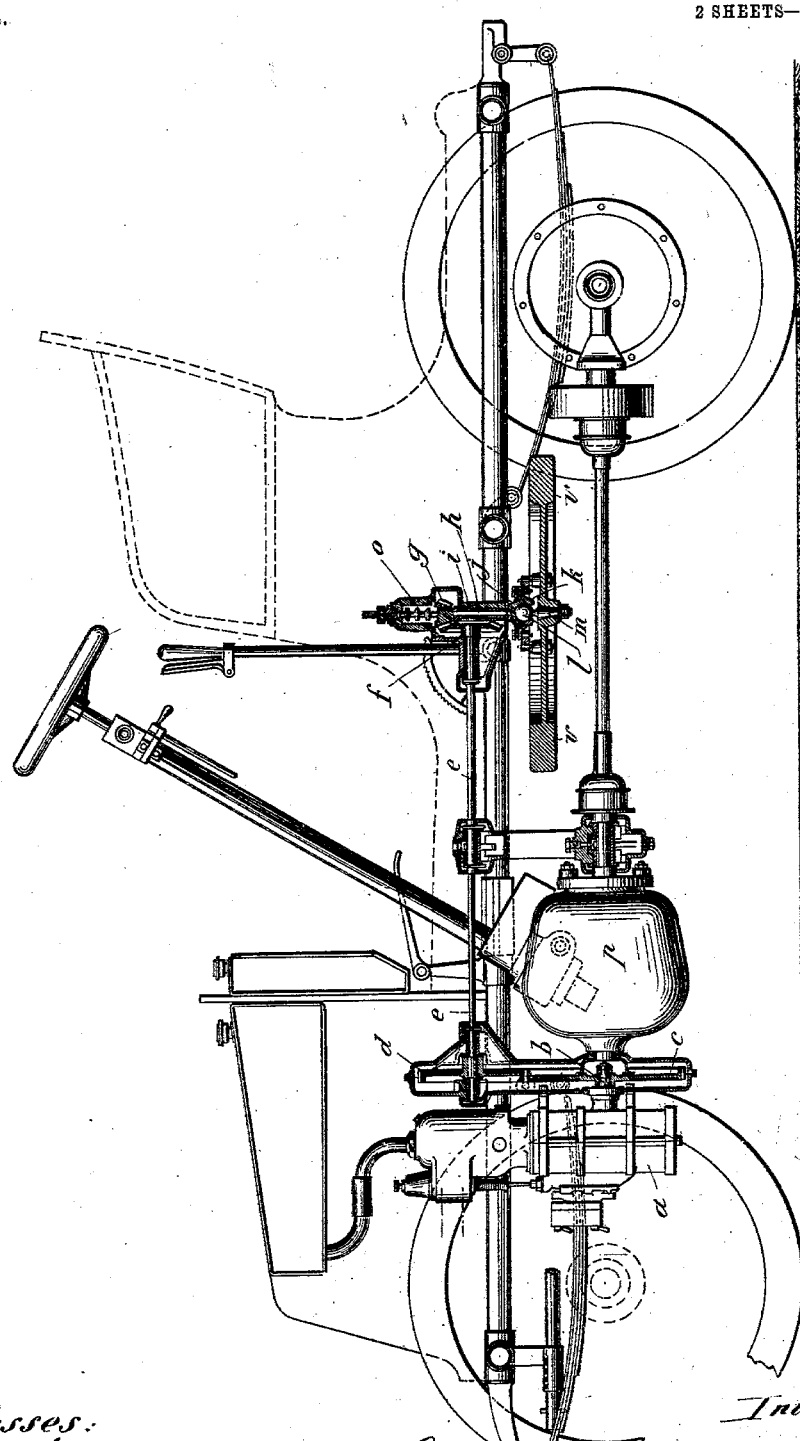

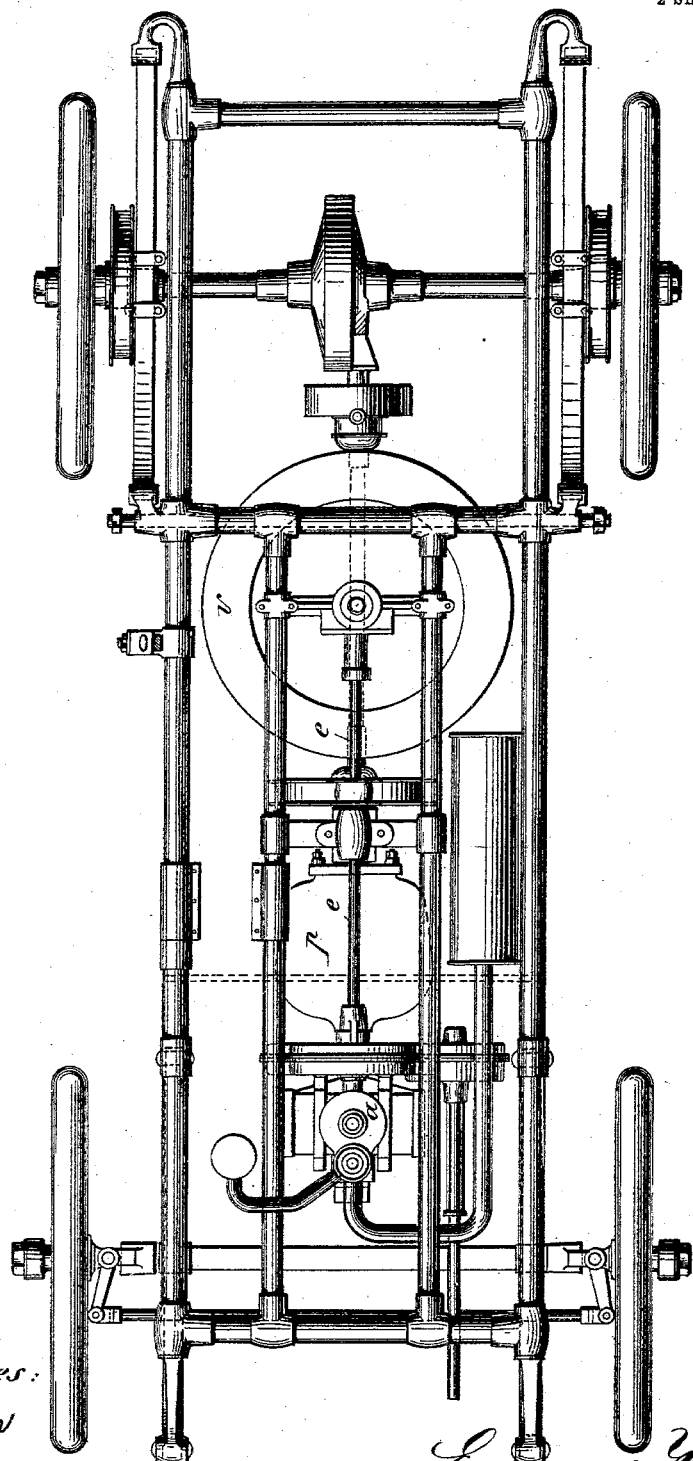

Patented December 1, 1903.

UNITED STATES PATENT OFFICE.

EDOUARD HOSPITALIER, OF PARIS, FRANCE.

MOTOR-CAR.

SPECIFICATION forming part of Letters Patent No. 745,441, dated December 1, 1903.

Application filed March 31, 1902. Serial No. 100,752. (No model.)

*To all whom it may concern:*

Be it known that I, EDOUARD HOSPITALIER, a citizen of the French Republic, and a resident of Paris, France, have invented certain new and useful Improvements in Motor-Cars, of which the following is a specification.

This invention relates to improvements in automobile vehicles, and has for its object the introduction of an auxiliary power with a view of facilitating the starting and the ascent of the vehicle on steep gradients. It would be possible to use a much lighter motor if the vehicle by some means could be provided with auxiliary mechanism which might be brought into action when the resisting force becomes greater than the motive power.

Heretofore autocars have been introduced in which the motive power is derived from the combined use of petroleum and electricity. These forms of vehicles have become known as "petro-accumobiles," in which the motive force is alternately stored and discharged by electric accumulators through the intervention of a dynamo adapted to act both as generator or as motor. Autocars have also been built in which energy has been stored up by a horizontal fly-wheel revolved at great velocity to be expended in reinforcement of the engine or dynamo when the work is too great for the latter to maintain normal speed.

My invention has for its object to improve the construction last named by the provision of a fly-wheel universally jointed to the foot of a vertical and elastically-yielding shaft and without other means of support, whereby it is enabled to maintain its plane of rotation in all positions of the car.

In the drawings, Figure 1 is a sectional side elevation of an automobile embodying my invention; and Fig. 2 is a top plan view thereof, omitting the box and certain other parts superposed upon the frame or reaches.

Although the general arrangement of parts remains the same, I am enabled by the adoption of the said accumulator fly-wheel to supply a less powerful and lighter motor without reducing the effective power of the vehicle, while it further permits the omission of the change-speed gear, and thereby simplifies the operative mechanism and reduces the weight, the price and labor in construction, and general attention.

By the adoption of my improved system the following advantages are obtained:

The motor maintains practically a uniform mean speed regardless of the irregularities of the route, and thus operates with a constant power—*i. e.*, under the most favorable conditions.

The speed of the vehicle can only in exceptional cases during its downgrade movement exceed a predetermined maximum speed, which is limited by that of which the motor is capable, bearing in mind the fact that the friction of the fly-wheel increases with the speed, and thus produces an advantageous brake action.

The speed of the vehicle remains practically constant and independent of the incline in the route while the motor is operating. Upon downgrade parts of the route the speed is lowered by repeated momentaneous disengagements of appropriate duration. Stopping of the vehicle is effected by the application of a brake after disengaging the motor mechanism, the brake mechanism being suitably connected with the former.

During stoppages or slowing speed when required to avoid or pass by vehicles and other obstructions the motor is disengaged, but continues to operate with full power on the fly-wheel and increases the speed, and consequently the kinematic energy of the latter, the power thereby accumulated in the form of increased speed at each period of stopping or slowing being given up at each fresh start. The motor and its fly-wheel combined in this manner is capable of developing unlimited motive power, and thereby places at our disposition the means for starting in a most rapid manner by a more or less quick operation of the coupling up, which is an obvious advantage in many cases.

When traveling over the inclined sides of a road, the fly-wheel acts as a natural brake by absorbing kinematic energy, which latter is given up subsequently when reaching a level or an uphill road and is not wasted, as in an ordinary brake, but is in reality a direct and automatic recuperation. With this arrangement of fly-wheel each stoppage or slowing down leads to a subsequent gain in speed contrary to what takes place in ordinary automobiles, where the fly-wheel has but an insignificant influence.

When ascending steep and rather long hills, which may cause the motor to slow down by more than thirty per one hundred of its normal speed, it is advisable to stop and allow the fly-wheel to regain its normal speed or more and then restart the vehicle. In this manner any ascent may be climbed by successive stages, yet without fear of failing entirely.

It may be thought that for long hills it would be most advantageous to use a slower speed-meshing; but it is easy to demonstrate by calculations that such an advantage is indeed an illusion by reason of the attendant complications of the mechanism and extra weight, together with additional difficulty in the operation, though it may not be incompatible in every case to be utilized in conjunction with my accumulator fly-wheel, which latter forms the chief subject of my invention.

In riding over long inclines and after having utilized a portion of the incline to increase the speed of the fly-wheel it will be necessary to apply the brake either by the use of ordinary means or by utilizing the rim of the fly-wheel as a brake by the application of an agglomerated friction-carbon of graphite or other material capable of a high temperature without burning. This powerful brake upon the high-speed periphery of the fly-wheel constitutes also a novel application of the latter.

The annexed drawings show the application of my system of mechanical accumulator to an automobile vehicle by way of example in Figs. 1 and 2 as a sectional elevation and a plan, respectively.

$a$ is the motor, with shaft $b$ for transmitting the motion through the intervention of a wheel $c$ and pinion $d$ to an intermediate shaft $e$. The shaft $e$ carries at its rear end a bevel-wheel $f$, meshing with a pinion $g$, fast upon a short shaft $h$. This latter is guided in a vertical bearing $i$, carried by a sleeve integral with the casing disposed around the two bevel-wheels $f$ and $g$. The shaft $h$ is integral at its lower end with a disk $j$, which is connected by screws or other means to another disk provided with a spherical cavity for the reception of a central ball-head, which belongs to the spindle $m$ of a heavy fly-wheel $v$, rigidly secured upon the latter, but practically unconfined and untrammeled as to the angle it may assume to said shaft $h$ upon any inclination of the car. The connection between the fly-wheel and the parts which impart to it or to which it transmits the motion, according to circumstances, is rendered elastic by means of said shaft $h$, which latter is allowed a certain amount of vertical play in the sleeve by reason of the presence of elastic parts $o$ at the upper end, thus permitting momentary automatic disengagement of the bevel-wheels $f$ and $g$ to uncouple the fly-wheel from the motor under certain conditions.

The proportions of the meshings $c\,d$ and $f\,g$ are such as to impart to the shaft $h$, carrying the fly-wheel, a speed of about five times that of the motor, so that with a motor performing twelve hundred strokes the fly-wheel will perform six thousand revolutions per minute.

The fly-wheel V is made of high-resisting material—say nickeled steel, for example. The motor-shaft $b$ is prolonged to the rear of the wheel $c$ by the armature-shaft of a continuous-current dynamo $p$ in series and serving both as the coupling means and change of speed in producing slipping by the introduction of a variable resistance into the circuit in the form of a rheostat adapted to be operated by hand or pedal.

During stoppages or slowing speed when required to avoid or pass by vehicles and other obstructions the motor is disengaged from the running-gear, but continues to operate with full power on the drive-wheel and increases the speed, and consequently the kinematic energy, of the latter, the power thereby accumulated in the form of increased speed being at each period of stopping or slowing given up at each fresh start, thus enabling the start to be made more rapid.

If desired, the single fly-wheel, with its vertically-disposed shaft, may be replaced by two fly-wheels of the same weight and adapted to turn in an inverse direction, but with equal speed.

Having now fully described my invention, what I claim, and desire to secure by Letters Patent, is—

In combination, a motor-car, a vertical shaft, a bearing in which said shaft is supported, a horizontal fly-wheel hung on the lower extremity of said shaft by means of a flexible joint, a gear on said shaft, a horizontal shaft provided with a gear meshing with the first-named gear, the motor carried by said car and means for operatively connecting said horizontal shaft with said motor.

In testimony whereof I have hereunto set my hand in presence of two witnesses.

EDOUARD HOSPITALIER.

Witnesses:
ADOLPHE STURM,
EDWARD P. MACLEAN.